Aug. 6, 1935.  C. M. DUECY  2,010,628
AUTOMATIC BRAKE CATCH AND RELEASE
Filed Nov. 23, 1933  3 Sheets—Sheet 1
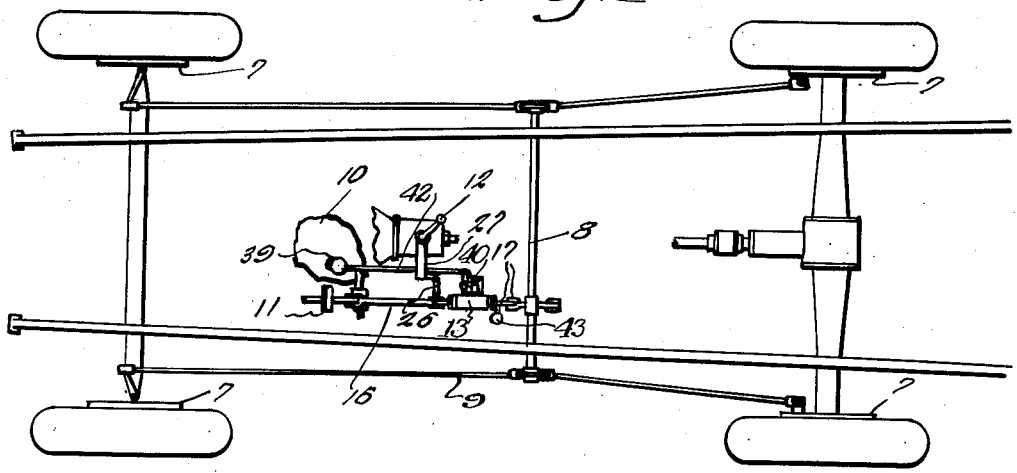
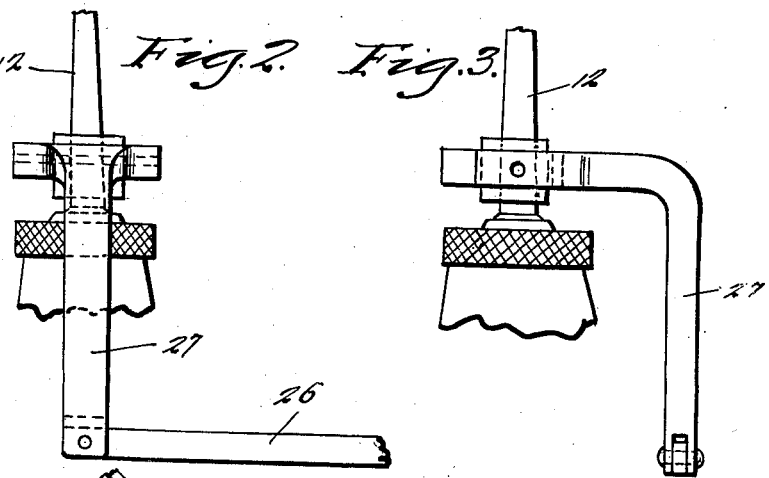
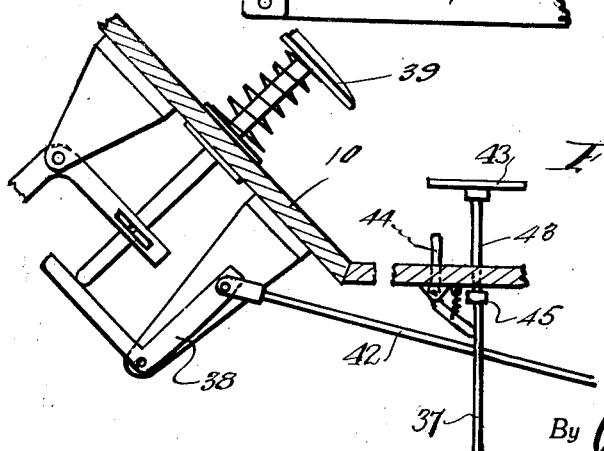
Inventor
Charles M. Duecy
By *Clarence A. O'Brien*
Attorney Aug. 6, 1935.  C. M. DUECY  2,010,628
AUTOMATIC BRAKE CATCH AND RELEASE
Filed Nov. 23, 1933   3 Sheets-Sheet 2
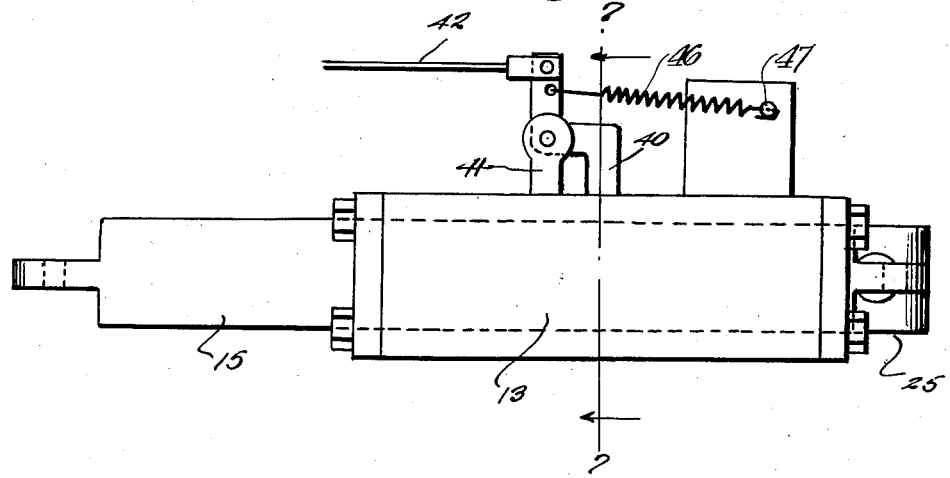
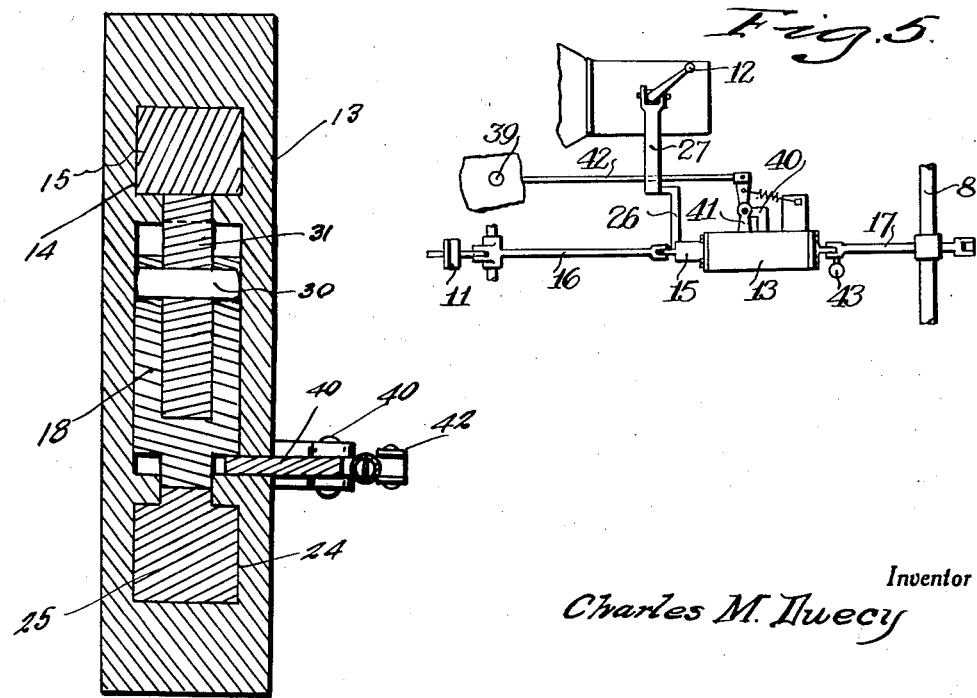
Inventor
Charles M. Duecy
By Clarence A. O'Brien
Attorney Aug. 6, 1935.  C. M. DUECY  2,010,628
AUTOMATIC BRAKE CATCH AND RELEASE
Filed Nov. 23, 1933  3 Sheets-Sheet 3
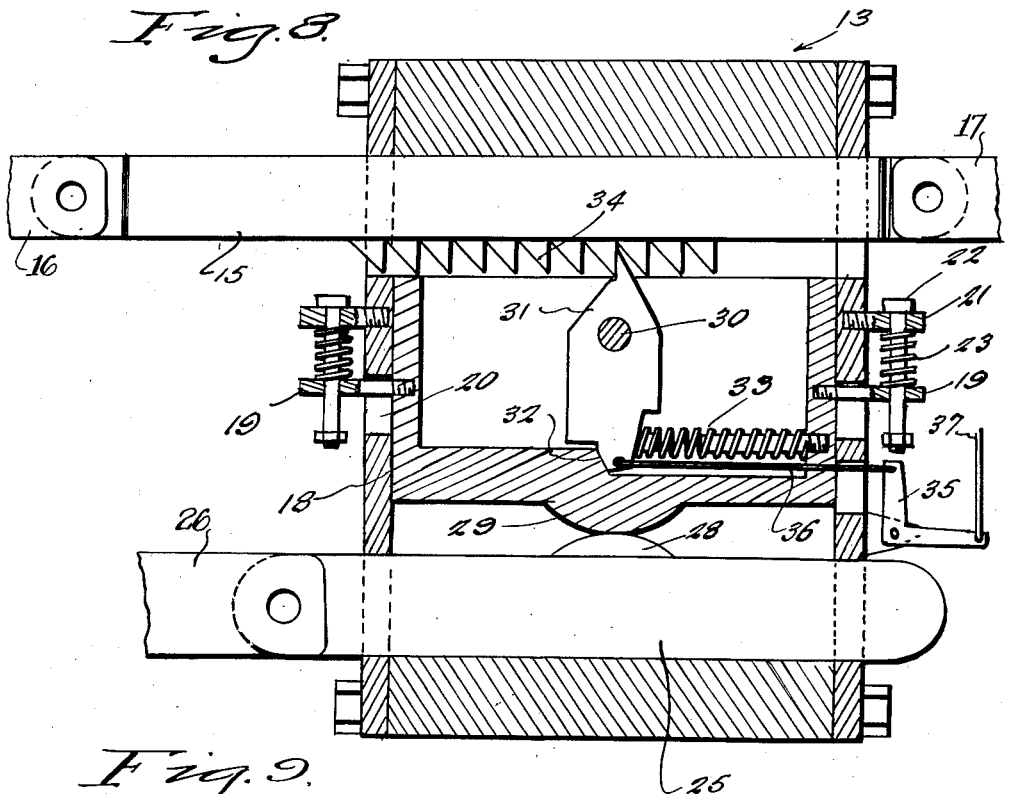
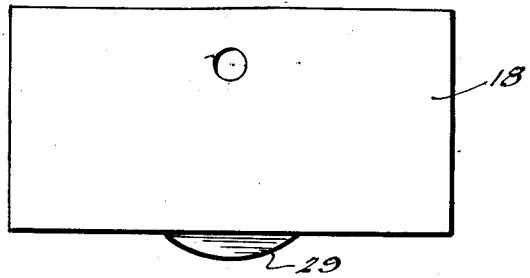
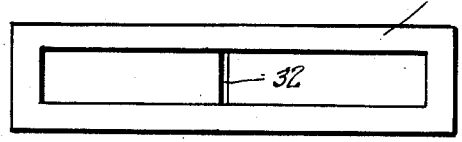
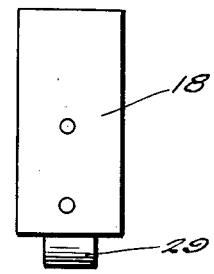
Inventor
Charles M. Duecy
By Clarence A. O'Brien
Attorney Patented Aug. 6, 1935

2,010,628

UNITED STATES PATENT OFFICE 2,010,628

AUTOMATIC BRAKE CATCH AND RELEASE

Charles M. Duecy, Everett, Wash.

Application November 23, 1933, Serial No. 699,461

16 Claims. (Cl. 192—4)

This invention pertains to a device for use in conjunction with motor driven vehicles for holding the wheel brakes of the vehicle in applied position when the automobile is in neutral gear, and to release the brakes when the automobile is in gear and the motor accelerated.

In accordance with the present invention a device of simple and economical construction is provided which may be readily applied, and which when in operation will operate automatically upon application of the brakes to hold the brakes in applied condition in a manner to be released automatically upon placing the automobile in either a forward or reverse speed and upon acceleration of the motor.

The invention together with its objects and advantages will be best understood from a study of the following description taken in connection with the accompanying drawings wherein:

Figure 1 is a top plan view illustrating the application of the invention.

Figure 2 is a view showing the connection between the shift lever and the automatic brake catch and release.

Figure 3 is a view at right angles to Figure 2.

Figure 4 is a fragmentary detail sectional view showing fragmentarily the mechanism for releasing the device, and also mechanism for securing the device in an inoperative position.

Figure 5 is a plan view, on an enlarged scale, of the parts shown in Figure 1.

Figure 6 is a top plan view of the device.

Figure 7 is a sectional view taken substantially on the line 7—7 of Figure 6.

Figure 8 is a vertical sectional view through the device.

Figure 9 is a side elevational view of a vertically shiftable member.

Figure 10 is a top plan view thereof, and

Figure 11 is an end elevational view thereof.

Referring to the drawings by reference numerals it will be seen that 7 indicates generally the vehicular wheel brakes of an automobile, 8 the brake shaft, connected with the brakes 7 through the medium of the rods 9, while 10 indicates the foot board, 11 the brake pedal, and 12 the gear shift lever.

The brake catch and release device indicated generally by the reference numeral 13 comprises a substantially box like structure which is mounted in suitable proximity to the brake shaft 8 as shown in Figure 1. Provided in the upper portion of the box like structure 13 is a guide 14 in which is mounted for horizontal reciprocation a bar 15 that is connected at one end through the medium of a link 16 with the brake pedal 11. At its other end the bar 15 is connected through the medium of an arm and link structure 17 with the shaft 8.

Mounted for vertical reciprocation within the box like structure 13 is a block 18 that has extending from opposite ends thereof apertured lugs 19 operating in slots 20 provided in the end walls of the box 13. Fixed apertured lugs 21 are provided on the end walls of the box 13 above the slots 20 and accommodate bolts 22 that extend through the lugs 21 and the lugs 19. Disposed about the bolts 22 between the lugs 19 and 21 are coil springs 23 that bear on the lugs 19 in a manner to normally urge the block 18 downwardly. Provided in the lower portion of the box 13 is a guide 24 in which operates a bar 25 that is connected at its forward end with a link 26 which in turn is connected to a suitably shaped clamp 27 secured to the shift lever 12 as will be clear from a study of Figures 1 to 3 inclusive.

On its upper edge the bar 25 is provided with a convex protuberance 28 that engages a similar protuberance 29 on the bottom of the block 18 for normally retaining the block in an elevated position against the action of spring 23. Obviously upon movement of the bar 25 toward the left in Figure 8 protuberance 28 is moved out of engagement with protuberance 29 permitting block 18 to move downwardly under action of said spring 23.

The upper portion of the block 18 is hollowed out and pivotally mounted as at 30 within the hollow of the block is a dog 31 that at one end is provided with a projection normally urged into engagement with a stop shoulder 32 provided in the bottom of the hollow of the block 18 through the medium of a suitable spring device 33. The upper end of the dog is adapted to engage teeth 34 provided on the lower edge of the bar 15.

For swinging the dog 31 to release the bar 15 there is suitably mounted on one end wall of the casing or box 13 a bell crank 35 which is connected at one end to the dog 31 by a link 36, and at its opposite end through the medium of a link 37 with the stem of a control pedal 43 that is conveniently located, the stem operating through a hole in the floor board. The stem of the pedal 43 as shown in Figure 4 is normally in raised or elevated position.

In the description of the invention thus far it will be apparent that when the brake pedal 11 is depressed for applying the brakes bar 15 will be pulled to the left in Figure 3 and through the connection between said bar 15 and the shaft 8 the latter will be rocked for applying the brakes. Retrograde or reverse movement of the bar 15 will be prevented by reason of the engagement of the dog 31 with the teeth 34 thus locking the brakes in applied position.

Assuming now that with the brakes applied and the shift lever 12 in neutral position, it is desired to set the automobile in motion. Upon manipulating the clutch pedal in the usual manner the lever 12 is also manipulated in the usual manner for placing the vehicle in gear at the desired speed. Manifestly the movement of the lever 12 to the proper position will result in a transmission of movement of the lever 12 to the bar 25 which is in its normal position or in the position shown in Figure 3. Under such movement bar 25 will be moved to the left in Figure 8 for moving the projections 28, 29 out of engagement so that the block 18 is free to move down under action of spring 23.

Manifestly the downward movement of the block 18 will disengage the dog 31 from the teeth 34 and because of the spring with which the brakes are usually provided the bar 15 will be caused to move toward the right in Figure 8 for releasing the brakes. However, to prevent immediate release of the brakes and to permit of the release of the brakes incidental to the acceleration of the motor it will be necessary for the operator to depress the accelerator pedal 39. Upon depression of this pedal the stop 40 will be swung outwardly from its position beneath the block 18 thus permitting the block 18 to move downwardly under the action of springs 23 to move the dog 31 out of engagement with the teeth 34, thus permitting the movement of the bar 15 to the right in Figure 8 for releasing the brakes.

As shown the stop member 40 is of angular construction and is pivoted intermediate its ends on a bracket 41 projecting from one side of the casing 13. The free end of the member 40 operates in a suitable slot provided therefor in the side of the casing 13 so as to engage against the bottom of the block 18 for normally retaining the block in its raised position. The other end of the member 40 is connected by a link 42 to the bell crank 38, the free end of which is arranged in proximity to the lower end of the stem of the accelerator pedal 39. The spring 46, anchored at one end as at 47 is connected at its opposite end with the stop 40 and serves to yieldably and normally urge the stop 40 inwardly to engage under the aforementioned block 18.

When it is desired to lock the device in an inoperative position so that the brakes can be controlled in the usual manner a suitably mounted pedal 43 arranged in proximity to the driver's seat may be depressed, and this pedal 43 having its end thereof connected to the bell crank 35 through the medium of the aforementioned link 37 will cause the dog 31 to swing in an anti-clockwise direction (see Figure 3) for moving the free end of the dog into the hollow of the block 18 and out of engagement with the bar 15. For locking the dog in this last named position there is provided a catch 44 that has one end arranged to engage the collar 45 provided on the stem of the pedal 43 when the pedal is depressed for preventing accidental upward movement of the pedal and thereby secure the device in an inoperative or ineffective position. The free end of the lever 44 extends above the floor board and can be readily kicked by the foot of the operator for releasing the pedal 43.

As will also appear clear to those skilled in the art this invention is susceptible of use in conjunction with hydraulic brakes in which event the device would be inserted between the brake pedal and the hydraulic control cylinder.

Having thus described my invention, what I claim as new is:

1. In an automobile brake mechanism, the combination with a rockably mounted brake shaft, a brake pedal, an accelerator pedal, and a gear shift lever, of an operating connection between said brake pedal and the brake shaft for transmitting movement of the pedal to the shaft for operating the brake and including means for locking the brake in an applied position, an operating connection between said locking means and the shift lever for releasing said locking means upon manipulation of the shift lever to place the automobile in a desired forward or reverse speed, for initiating release of said locking means, and an operating connection between said locking means and the accelerator pedal for effecting a final release of the brake upon acceleration of the motor of the vehicle.

2. In an automotive brake mechanism, in combination, a brake shaft, a brake pedal, a brake locking and releasing device including a casing, a bar slidably mounted in said casing and operatively connected at one end with the brake pedal, and at a relatively opposite end with the brake shaft, a vertically shiftable member mounted in said casing, a dog carried by said vertically shiftable member and rack teeth on said bar with which the dog is engaged for preventing reverse movement of the bar upon application of the brakes, yieldable means normally urging said vertically shiftable member downwardly, means acting in opposition to said yieldable means for normally retaining the vertically shiftable member in an elevated position, a shift lever, and an operating connection between said shift lever and the last named means for releasing the vertically shiftable member upon manipulation of the shift lever for releasing the brake incidental to the placing of the automobile in the desired forward or reverse speed.

3. In an automotive brake mechanism, and in combination, a rockable brake shaft, a brake pedal, a casing suitably mounted between the brake shaft and the brake pedal, a tooth equipped bar slidably mounted in the casing and operatively connected at one end with the brake pedal, and at a relatively opposite end with the brake shaft, a member vertically slidable in said casing, a pivotally mounted dog carried by the member engageable with the teeth of the bar for holding the bar against movement in one direction, a second bar slidably mounted in said casing, interengaging means on the dog carrying member and the second bar for normally holding the block in position to engage the dog with the teeth of the first mentioned bar, a gear shift lever, and an operating connection with said gear shift lever and the second bar for releasing said vertically slidable member.

4. In an automotive brake mechanism, and in combination, a rockable brake shaft, a brake pedal, a casing suitably mounted between the brake shaft and the brake pedal, a tooth equipped bar slidably mounted in the casing and operatively connected at one end with the brake pedal, and at a relatively opposite end with the brake shaft, a block vertically slidable with said casing, a pivotally mounted dog carried by the block engageable with the teeth of the bar for holding the bar against movement in one direction, a second bar slidably mounted in said casing, interengaging means on the dog carrying block and the second bar for normally holding the block in position to engage the dog with the teeth of the first mentioned bar, a gear shift lever, and an operating connection with said gear shift lever and the second bar for releasing said block, a member pivotally mounted on said casing and having an end extending into the casing and engaging under the block to hold the block in one position independently of the second named bar, an accelerator pedal, and an operating connection between said accelerator pedal and said pivoted member for releasing the block subsequent to a manipulation of the gear shift lever and incidental to the acceleration of the motor of the vehicle.

5. In an automotive brake mechanism, and in combination, a rockable brake shaft, a brake pedal, a casing suitably mounted between the brake shaft and the brake pedal, a tooth equipped bar slidably mounted in the casing and operatively connected at one end with the brake pedal, and at a relatively opposite end with the brake shaft, a block vertically slidable in said casing, a pivotally mounted dog carried by the block engageable with the teeth of the bar for holding the bar against movement in one direction, a second bar slidably mounted in said casing, interengaging means on the dog carrying block and the second bar for normally holding the block in position to engage the dog with the teeth of the first mentioned bar, a gear shift lever, and an operating connection with said gear shift lever and the second bar for releasing said block, a member pivotally mounted on said casing and having an end extending into the casing and engaging under the block to hold the block in one position independently of the second named bar, an accelerator pedal, and an operating connection between said accelerator pedal and said pivoted member for releasing the block subsequent to a manipulation of the gear shift lever and incidental to the acceleration of the motor of the vehicle, and means for moving said dog out of engagement with the teeth of the first named bar independently of said block and for retaining said dog in its released position.

6. In an automotive brake mechanism, and in combination, a rockable brake shaft, a brake pedal, a casing suitably mounted between the brake shaft and the brake pedal, a tooth equipped bar slidably mounted in the casing and operatively connected at one end with the brake pedal, and at a relatively opposite end with the brake shaft, a member vertically slidable in said casing, a pivotally mounted dog carried by the member engageable with the teeth of the bar for holding the bar against movement in one direction, a second bar slidably mounted in said casing, interengaging means on the dog carrying block and the second bar for normally holding the block in position to engage the dog with the teeth of the first mentioned bar, a gear shift lever, and an operating connection with said gear shift lever and the second bar for releasing said block, a member pivotally mounted on said casing and having an end extending into the casing and engaging under the block to hold the block in one position independently of the second named bar, an accelerator pedal, and an operating connection between said accelerator pedal and said pivoted member for releasing the block subsequent to a manipulation of the gear shift lever and incidental to the acceleration of the motor of the vehicle, and means for moving said dog out of engagement with the teeth of the first named bar independently of said block and for retaining said dog in its released position, said last named means including a manipulating button, an operating connection between said button and the dog for swinging the latter, and quick releasable means operatively connected with said button for securing the button in position to retain the dog out of engagement with the teeth of the first named bar.

7. In an automobile braking system including a brake pedal, shift lever and accelerator pedal; a catch and release device adapted to be connected to the braking system to hold it in braking position, means for actuating the device from the brake pedal, means for partially releasing the device from the shift lever, means for finally releasing the device from the accelerator pedal subsequent to a manipulation of the shift lever and incidental to the acceleration of the motor of the automobile, and means controlling the operating connection between the braking system and the device including means to hold the device free of operative connection with the brake system to thereby permit use of the system independently of the device.

8. In an automobile, in combination with a braking system including a brake pedal; a shift lever, and an accelerator pedal, a brake catch and release device comprising a slide member having an operating connection with the brake pedal, means for checking the return of said slide member having operating connections respectively with the shift lever and the accelerator pedal respectively for partially releasing the slide upon manipulation of the shift lever and for finally releasing the slide upon manipulation of the accelerator pedal, and means for locking the checking means in a position disengaged from the slide to thereby permit free movement of the slide in either of two directions.

9. In an automobile braking system including a brake pedal, shift lever and accelerator, a catch and release device for said braking system having an operating connection with the brake pedal and releasing connection with the shift lever and accelerator respectively.

10. In an automobile braking system including a brake pedal, shift lever and accelerator pedal, a catch and release device comprising means operated from the brake pedal for applying the brakes, controlling means respectively having operating connections with the shift lever and accelerator pedal for releasing the brakes incidental to an acceleration of the motor of the automobile and subsequent to the placing of the automobile in gear, and locking means rendering the device ineffective as a catch or release for the brake system.

11. An automobile brake comprising a brake pedal, a slide member operated from the brake pedal to apply and release the brake, means for preventing return of the member when the brake pedal is moved in the direction of application of the brake, a gear shift lever, an accelerator, and said prevention means being automatically released by the successive manipulation of the gear shift lever, and the accelerator of the automobile to prevent complete release of the brake upon movement of the brake pedal alone in the direction of release of the brake.

12. In an automobile brake mechanism, the combination with a rockably mounted brake shaft, a brake pedal, an accelerator pedal, and a gear shift lever, of an operating connection between said brake pedal and the brake shaft for transmitting movement of the pedal to the shaft for operating the brake and including means for locking the brake in an applied position, an operating connection between said locking means and the shift lever for releasing said locking means upon manipulation of the shift lever to place the automobile in a desired forward or reverse speed, for initiating release of said brake, and an operating connection between said locking means and the accelerator pedal for effecting a final release of the brake upon acceleration of the motor of the vehicle, and means operable independently of the shift lever and the accelerator pedal for securing said locking means in release position to thereby permit the brake mechanism to be operated in the usual manner.

13. In an automotive brake mechanism, in combination, a brake shaft, a brake pedal, a brake locking and releasing device including a casing, a bar slidably mounted in said casing and operatively connected at one end with the brake pedal, and at a relatively opposite end with the brake shaft, a vertically shiftable member mounted in said casing, a dog carried by said vertically shiftable member and rack teeth on said bar with which the dog is engaged for preventing reverse movement of the bar upon application of the brakes, yieldable means normally urging said vertically shiftable member downwardly, means acting in opposition to said yieldable means for normally retaining the vertically shiftable member in an elevated position, an accelerator pedal, and an operating connection between said accelerator pedal and the last named means for releasing the vertically shiftable member incidental to a depressing of the accelerator pedal.

14. In a device of the character described, a casing, a tooth equipped bar slidably mounted in the casing, a member vertically slidable in said casing, a pivotally mounted dog carried by said member and engageable with the teeth of said bar for holding the latter against movement in one direction, a second bar slidably mounted in said casing, inter-engaging means on the dog carrying member and the second bar for normally holding the dog in position to engage the teeth of the first mentioned bar, spring means normally urging said vertically slidable member downwardly, and means for shifting the second bar to free said dog.

15. In a device of the character described, a casing, a bar slidably mounted in said casing, a vertically shiftable member mounted in said casing, a dog carried by said vertically shiftable member and rack teeth on said bar with which the dog is engaged for preventing movement of said bar in one direction, yieldable means normally urging said vertically shiftable member downwardly, and means shiftable in a plane parallel to said slidable bar and engageable with said vertically shiftable member for normally retaining the vertically shiftable member in an elevated position, and actuating mechanism for said last mentioned means.

16. In a device of the character described, a casing, a bar slidably mounted in the casing and provided with rack teeth, a vertically shiftable member mounted in the casing, a dog carried by said vertically shiftable member and engageable with the rack teeth for releasably retaining said bar against movement in one direction, yieldable means normally urging said vertically slidable member downwardly, a second bar slidably mounted in the casing, inter-engaging means on the second bar and said vertically shiftable member for normally urging said vertically shiftable member upwardly to engage the dog with the rack teeth, and a pivoted latch member mounted on the wall of the casing and arranged to engage the vertically shiftable member for holding the same in elevated position independently of the second named bar.

CHARLES M. DUECY.